(12) United States Patent
Abe

(10) Patent No.: US 10,118,444 B2
(45) Date of Patent: Nov. 6, 2018

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 252 days.

(21) Appl. No.: 15/035,527

(22) PCT Filed: Oct. 24, 2014

(86) PCT No.: PCT/JP2014/078356
§ 371 (c)(1),
(2) Date: May 10, 2016

(87) PCT Pub. No.: WO2015/072312
PCT Pub. Date: May 21, 2015

(65) Prior Publication Data
US 2016/0297244 A1 Oct. 13, 2016

(30) Foreign Application Priority Data

Nov. 15, 2013 (JP) .................. 2013-237104
Nov. 15, 2013 (JP) .................. 2013-237105

(51) Int. Cl.
*B60C 7/14* (2006.01)
*B60C 7/18* (2006.01)
(Continued)

(52) U.S. Cl.
CPC .................. *B60C 7/14* (2013.01); *B60B 9/08* (2013.01); *B60B 9/26* (2013.01); *B60C 7/18* (2013.01);
(Continued)

(58) Field of Classification Search
CPC .... B60B 9/00; B60B 9/02; B60B 9/04; B60B 9/26; B60C 7/14; B60C 7/18; B60C 2007/146
See application file for complete search history.

(56) References Cited

U.S. PATENT DOCUMENTS

| 1,345,827 A | 7/1920 | Bohannon |
| 1,376,795 A | 5/1921 | Bowman |

(Continued)

FOREIGN PATENT DOCUMENTS

| CN | 101668646 A | 3/2010 |
| EP | 0 353 006 A2 | 1/1990 |

(Continued)

OTHER PUBLICATIONS

Communication dated Feb. 28, 2017 issued by the State Intellectual Property Office of People's Republic of China in counterpart Application No. 2014800620479.

(Continued)

*Primary Examiner* — Jason R Bellinger
(74) *Attorney, Agent, or Firm* — Sughrue Mion, PLLC

(57) ABSTRACT

In a non-pneumatic tire, central portions in an extension direction of first elastic connecting plates (21) and central portions in an extension direction of second elastic connecting plates (22) are spaced from each other in a tire width direction (H) by a distance of 0.25 to 0.9 times an outer tube width (W1) serving as a size in the tire width direction (H) of an outer tubular body (13), edges of a first side in the tire width direction (H) of first end portions (21*a*) of the first elastic connecting plates (21) are disposed at the same positions in the tire width direction (H) as edges of the first side in the tire width direction (H) of the outer tubular body (13) or disposed inside in the tire width direction (H) of the edge of the first side in the tire width direction (H) of the outer tubular body (13) within a distance of 0.1 times the (Continued)

outer tube width (W1) or less, and edges of a second side in the tire width direction (H) of first end portions (22a) of the second elastic connecting plates (22) are disposed at the same positions in the tire width direction (H) as an edge of the second side in the tire width direction (H) of the outer tubular body (13) or disposed inside in the tire width direction (H) of the edge of the second side in the tire width direction (H) of the outer tubular body (13) within a distance of 0.1 times the outer tube width (W1) or less.

9 Claims, 11 Drawing Sheets

(51) Int. Cl.
- B60B 9/08 (2006.01)
- B60B 9/26 (2006.01)
- B60C 11/00 (2006.01)
- B60B 9/04 (2006.01)
- B29D 30/02 (2006.01)

(52) U.S. Cl.
CPC .............. *B60C 11/00* (2013.01); *B29D 30/02* (2013.01); *B60B 9/04* (2013.01); *B60C 2007/146* (2013.01)

(56) References Cited

U.S. PATENT DOCUMENTS

| | | | |
|---|---|---|---|
| 1,460,494 A | | 7/1923 | Miller |
| 1,492,068 A | | 4/1924 | Cabretosa |
| 9,511,625 B2 * | | 12/2016 | Nishida ..................... B60B 9/04 |
| 9,550,393 B2 * | | 1/2017 | Abe ........................... B60C 7/18 |
| 9,616,703 B2 * | | 4/2017 | Nishida ..................... B60B 9/04 |
| 9,713,940 B2 * | | 7/2017 | Nishida ..................... B60C 7/16 |
| 9,902,202 B2 * | | 2/2018 | Shoji ......................... B60C 7/14 |
| 2010/0200131 A1 | | 8/2010 | Iwase et al. |
| 2011/0272254 A1 | | 11/2011 | Anderfaas et al. |
| 2011/0290394 A1 | | 12/2011 | Luchini et al. |
| 2014/0251518 A1 * | | 9/2014 | Abe ........................... B60B 9/04 152/75 |
| 2015/0273946 A1 * | | 10/2015 | Abe ........................... B60C 7/18 152/316 |
| 2016/0193876 A1 * | | 7/2016 | Kyo ........................... B60B 9/04 152/84 |
| 2016/0236514 A1 * | | 8/2016 | Abe ........................... B60C 7/18 |
| 2016/0272006 A1 * | | 9/2016 | Abe ........................... B60C 7/14 |
| 2017/0015141 A1 * | | 1/2017 | Shoji ......................... B60C 7/18 |
| 2017/0120680 A1 * | | 5/2017 | Takahashi ................. B60C 7/14 |
| 2017/0136814 A1 * | | 5/2017 | Abe ........................... B60B 9/04 |
| 2017/0253084 A1 * | | 9/2017 | Takahashi ................. B60C 7/26 |
| 2017/0305195 A1 * | | 10/2017 | Takahashi ................. B60C 7/14 |
| 2018/0056720 A1 * | | 3/2018 | Abe ........................... B60C 7/24 |

FOREIGN PATENT DOCUMENTS

| | | |
|---|---|---|
| EP | 0 561 222 A1 | 9/1993 |
| EP | 2 910 386 A1 | 8/2015 |
| EP | 3 061 624 A1 | 8/2016 |
| FR | 378543 A | 10/1907 |
| GB | 125288 A | 4/1919 |
| GB | 190161 A | 1/1923 |
| JP | 16-12562 Y1 | 8/1941 |
| JP | 2-182501 A | 7/1990 |
| JP | 2011-156905 A1 | 8/2011 |
| JP | 2011-156906 A1 | 8/2011 |
| JP | 2012-187982 A | 10/2012 |
| JP | 2013-86712 A | 5/2013 |
| JP | 2013-151292 A | 8/2013 |
| WO | 2010/012091 A1 | 2/2010 |

OTHER PUBLICATIONS

International Search Report of PCT/JP2014/078356, dated Jan. 27, 2015. [PCT/ISA/210].

Written Opinion of PCT/JP2014/078356, dated Jan. 27, 2015. [PCT/ISA/237].

\* cited by examiner

NON-PNEUMATIC TIRE

TECHNICAL FIELD

The present invention relates to a non-pneumatic tire that can be used without being filled with pressurized air.

This application is a National Stage of International Application No. PCT/JP2014/078356 filed Oct. 24, 2014, claiming priorities based on Japanese Patent Application Nos. 2013-237104, filed Nov. 15, 2013, and 2013-237105, filed Nov. 15, 2013, the contents of all of which are incorporated herein by reference in their entirety.

BACKGROUND ART

In a pneumatic tire of the related art that is filled with pressurized air and used, the occurrence of a blowout is a structurally unavoidable problem.

In order to solve this problem, in recent years, for example, as disclosed in the following Patent Document 1, a non-pneumatic tire including an attachment body attached to an axle, an outer tubular body configured to surround the attachment body from the outside in a tire radial direction, and a connecting member configured to connect the attachment body and the outer tubular body while allowing a displacement therebetween has been proposed.

DOCUMENT OF RELATED ART

Patent Document

[Patent Document 1]
Japanese Unexamined Patent Application, First Publication No. 2013-86712

SUMMARY OF INVENTION

Technical Problem

However, in the non-pneumatic tire of the related art, cornering performance of the tire should be improved more.

In addition, the inventor(s) of the application has found that, in the non-pneumatic tire of the related art, during traveling of the non-pneumatic tire, unintended lateral force in a tire width direction occurs.

In consideration of the above-mentioned circumstances, the present invention is directed to provide a non-pneumatic tire capable of improving cornering performance, suppressing generation of a lateral force during traveling, and improving steering stability.

Solution to Problem

A non-pneumatic tire according to the present invention includes: an attachment body attached to an axle; an outer tubular body configured to surround the attachment body from the outside in a tire radial direction; and connecting members configured to connect the attachment body and the outer tubular body while allowing a displacement therebetween; the connecting members including first elastic connecting plates positioned on a first side thereof in a tire width direction and second elastic connecting plates positioned on a second side thereof in the tire width direction, which are disposed different positions in the tire width direction; wherein central portions of the first elastic connecting plates in a direction in which the first elastic connecting plates extend between the attachment body and the outer tubular body and central portions of the second elastic connecting plates in a direction in which the second elastic connecting plates extend between the attachment body and the outer tubular body are separated from each other in the tire width direction by a distance of 0.25 to 0.9 times an outer tube width serving as a size in the tire width direction of the outer tubular body; edges of the first side in the tire width direction of first end portions of the first elastic connecting plates connected to the outer tubular body are disposed at the same position in the tire width direction as an edge of the first side in the tire width direction of the outer tubular body, or disposed inside in the tire width direction of the edge of the first side in the tire width direction of the outer tubular body within a distance of 0.1 times the outer tube width or less; and edges of the second side in the tire width direction of first end portions of the second elastic connecting plates connected to the outer tubular body are disposed at the same position in the tire width direction as an edge of the second side in the tire width direction of the outer tubular body, or disposed inside in the tire width direction of the edge of the second side in the tire width direction of the outer tubular body and disposed within a distance of 0.1 times the outer tube width or less.

According to the present invention, since the central portions of the first elastic connecting plates and the central portions of the second elastic connecting plates are spaced apart from each other in the tire width direction by a distance of 0.25 to 0.9 times the outer tube width, all of the elastic connecting plates are limited from cushioning each other when they are deformed, an increase in weight of the non-pneumatic tire can be limited while increasing lateral stiffness serving as stiffness in the tire width direction of the connecting members. That is, when an interval in the tire width direction between the central portions of the first elastic connecting plates and the central portions of the second elastic connecting plates is smaller than 0.25 times the outer tube width, a member width serving as the size in the tire width direction of each of the connecting members cannot be easily secured, and an increase in lateral stiffness of the connecting member may become difficult. In addition, when the interval is larger than 0.9 times the outer tube width in the tire width direction, the member width of the connecting member is excessively large, and limitation of an increase in weight of the non-pneumatic tire becomes difficult.

Here, as an increase in weight of the non-pneumatic tire is limited while increasing lateral stiffness of the connecting members in this way, a cornering force generated upon cornering of the non-pneumatic tire can be received by the connecting members.

Further, in the non-pneumatic tire, the edges of the first side in the tire width direction of the first end portions of the first elastic connecting plates are disposed at the same positions in the tire width direction as the edge of the first side in the tire width direction of the outer tubular body (hereinafter, referred to as "a first side edge of the outer tubular body"), or disposed inside in the tire width direction of the first side edge of the outer tubular body within a distance of 0.1 times the outer tube width or less. Moreover, the edges of the second side in the tire width direction of the first end portions of the second elastic connecting plates are disposed at the same positions in the tire width direction as the edge of the second side in the tire width direction of the outer tubular body (hereinafter, referred to as "the second side edge of the outer tubular body") or disposed inside in the tire width direction of the second side edge of the outer tubular body within a distance of 0.1 times the outer tube width or less.

Accordingly, when the non-pneumatic tire corners and a camber is input, an occurrence of stress at the first end portions of all of the elastic connecting plates can be limited. That is, when the first end portions of the first elastic connecting plates and the second elastic connecting plates overhang the first side edge or the second side edge of the outer tubular body outward in the tire width direction, the camber is directly input into the first end portions, and the stress generated at the first end portions may be significantly increased. In addition, when the first end portions of the first elastic connecting plates and the second elastic connecting plates are spaced apart from the first side edge or the second side edge of the outer tubular body in the tire width direction by a distance larger than 0.1 times the outer tube width, a stress concentration place may be easily formed in the first end portions.

Additionally, since a generation of the stress in the first end portions of all of the elastic connecting plates upon cornering can be limited in this way, as described above, in combination with an easy reception of the cornering force generated upon cornering by the connecting member, for example, a posture of the non-pneumatic tire upon cornering can be stabilized, and cornering performance can be improved.

In addition, the first elastic connecting plates and the second elastic connecting plates may extend toward opposite sides in a tire circumferential direction while extending inward from the outer tubular body in the tire radial direction, and a distance in the tire width direction between the central portions in the tire width direction of the first end portions of all of the elastic connecting plates may be 0.7 times the outer tube width or less.

In this case, since all of the elastic connecting plates extend toward opposite sides in the tire circumferential direction while extending from the outer tubular body inward in the tire radial direction, when the compressive load in the tire radial direction is applied to the non-pneumatic tire upon traveling of the non-pneumatic tire and the connecting members are compressively deformed in the tire radial direction, forces from the first end portions of all of the elastic connecting plates toward opposite sides in the tire circumferential direction are applied to the outer tubular body. Here, since all of the elastic connecting plates are disposed at different positions in the tire width direction, as the above-mentioned forces are applied to the outer tubular body from the first end portions of all of the elastic connecting plates, a moment around an axis extending in the tire radial direction is generated in a portion of the outer tubular body to which the connecting members are connected.

The inventor(s) of the application has found that the above-mentioned moment is generated in the non-pneumatic tire and the moment generates an unintended lateral force upon traveling of the non-pneumatic tire.

Here, the distance in the tire width direction between the central portions in the tire width direction of the first end portions of all of the elastic connecting plates connected to the outer tubular body is 0.7 times the outer tube width or less. Accordingly, generation of the above-mentioned moment can be limited without a complex structure, and linearity of the non-pneumatic tire can be increased to improve the steering stability.

Accordingly, not only the cornering performance but also the linearity can be improved, and steering stability of the non-pneumatic tire can be reliably improved.

In addition, a cylindrical tread member fitted onto the outer tubular body may be provided, and an outer circumferential surface of the tread member may form a curved surface shape protruding outward in the tire radial direction when seen in a cross-sectional view in the tire width direction.

In this case, since the outer circumferential surface of the tread member forms the curved surface shape protruding outward in the tire radial direction when seen in the cross-sectional view in the tire width direction and a large force is applied to the end portion of the outer tubular body when the camber is input, the above-mentioned effect of improving the cornering performance can be remarkably exhibited.

In addition, a plurality of curved sections curved in the tire circumferential direction may be formed on at least one elastic connecting plate of the first elastic connecting plates and the second elastic connecting plates in an extension direction in which the elastic connecting plates extend in a tire side view when the non-pneumatic tire is seen from the tire width direction, curved directions of the curved sections neighboring in the extension direction may be opposite to each other, and a cross-sectional area of an inflection section of the elastic connecting plate disposed between the curved sections neighboring in the extension direction may be smaller than a cross-sectional area of another portion of the elastic connecting plate.

In this case, since the curved directions of the curved sections neighboring in the extension direction are opposite to each other, when the compressive load in the tire radial direction is applied to the non-pneumatic tire, the inflection section cannot be easily deformed but are mainly displaced, and the load applied to the inflection section in the elastic connecting plate can be limited in comparison with another portion.

Additionally, since the cross-sectional area of the inflection section is smaller than the cross-sectional area of the other portion of the elastic connecting plate except for the inflection section, a reduction in weight can be achieved while preventing a decrease in strength of the connecting member.

In addition, the cross-sectional area of the elastic connecting plate may be gradually reduced toward the inflection section in the extension direction.

In this case, a reduction in weight can be effectively achieved while suppressing generation of a stress concentration place in the elastic connecting plate.

In addition, at least one of a size in the tire width direction and a size in the tire circumferential direction of the inflection section of the elastic connecting plate may be smaller than other portions.

In this case, the non-pneumatic tire that exhibits the above-mentioned effects can be reliably obtained.

In addition, the first elastic connecting plates and the second elastic connecting plates may extend outward in the tire width direction from the attachment body toward the outer tubular body.

In this case, since the first elastic connecting plates and the second elastic connecting plates extend outward in the tire width direction from the attachment body toward the outer tubular body, for example, the force applied to the end portion of the outer tubular body when the camber is input can be easily received by the connecting members based on the shape of the elastic connecting plates, and the cornering performance can be further improved.

In addition, all of the elastic connecting plates may extend outward in the tire width direction from the outer tubular body toward the attachment body.

In this case, since all of the elastic connecting plates extend outward in the tire width direction from the outer tubular body toward the attachment body, the member width serving as the size in the tire width direction of the connecting members can be easily secured while suppressing a generation of the above-mentioned moment. Accordingly, the lateral stiffness of the connecting members can be improved, and the steering stability of the non-pneumatic tire can be improved more.

Advantageous Effects of Invention

According to the present invention, cornering performance of the tire can be improved. In addition, a lateral force generated during traveling can be limited, and steering stability can be improved.

DESCRIPTION OF EMBODIMENTS

First Embodiment

Figure 1:
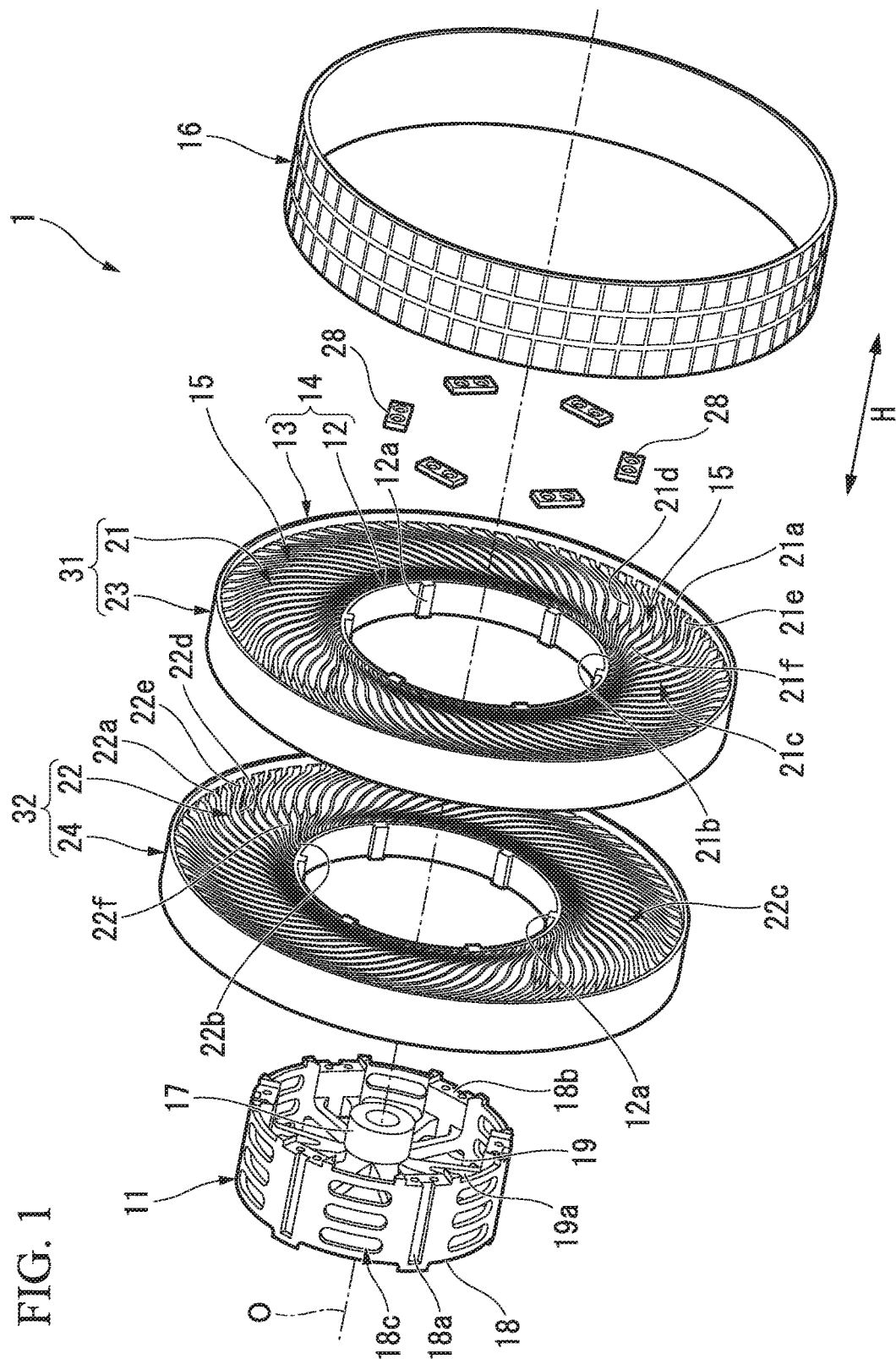
FIG. 1 is an exploded schematic perspective view showing a portion of a non-pneumatic tire of the first embodiment according to the present invention.

Hereinafter, a first embodiment of a non-pneumatic tire according to the present invention will be described with reference to FIGS. 1 to 6.

A non-pneumatic tire 1 includes an attachment body 11 attached to an axle (not shown), a ring member 14 including an inner tubular body 12 fitted onto the attachment body 11 and an outer tubular body 13 configured to surround the inner tubular body 12 from the outside in a tire radial direction, a plurality of connecting members 15 disposed between the inner tubular body 12 and the outer tubular body 13 in a tire circumferential direction and connecting the tubular bodies 12 and 13 to each other while allowing relative elastic displacement therebetween, and a tread member 16 disposed at an outer circumferential surface side of the outer tubular body 13 throughout the circumference.

Here, the attachment body 11, the inner tubular body 12, the outer tubular body 13 and the tread member 16 are disposed coaxially with a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner tubular body 12, the outer tubular body 13 and the tread member 16 are disposed such that central portions thereof in the tire width direction H coincide with each other.

In the ring member 14, a size in the tire width direction H, i.e., a width, of the outer tubular body 13 is larger than that of the inner tubular body 12. In addition, a plurality of protrusion sections 12a protruding inward in the tire radial direction and extending throughout the length in the tire width direction H are formed at an inner circumferential surface of the inner tubular body 12 at intervals in the tire circumferential direction.

Figure 2:
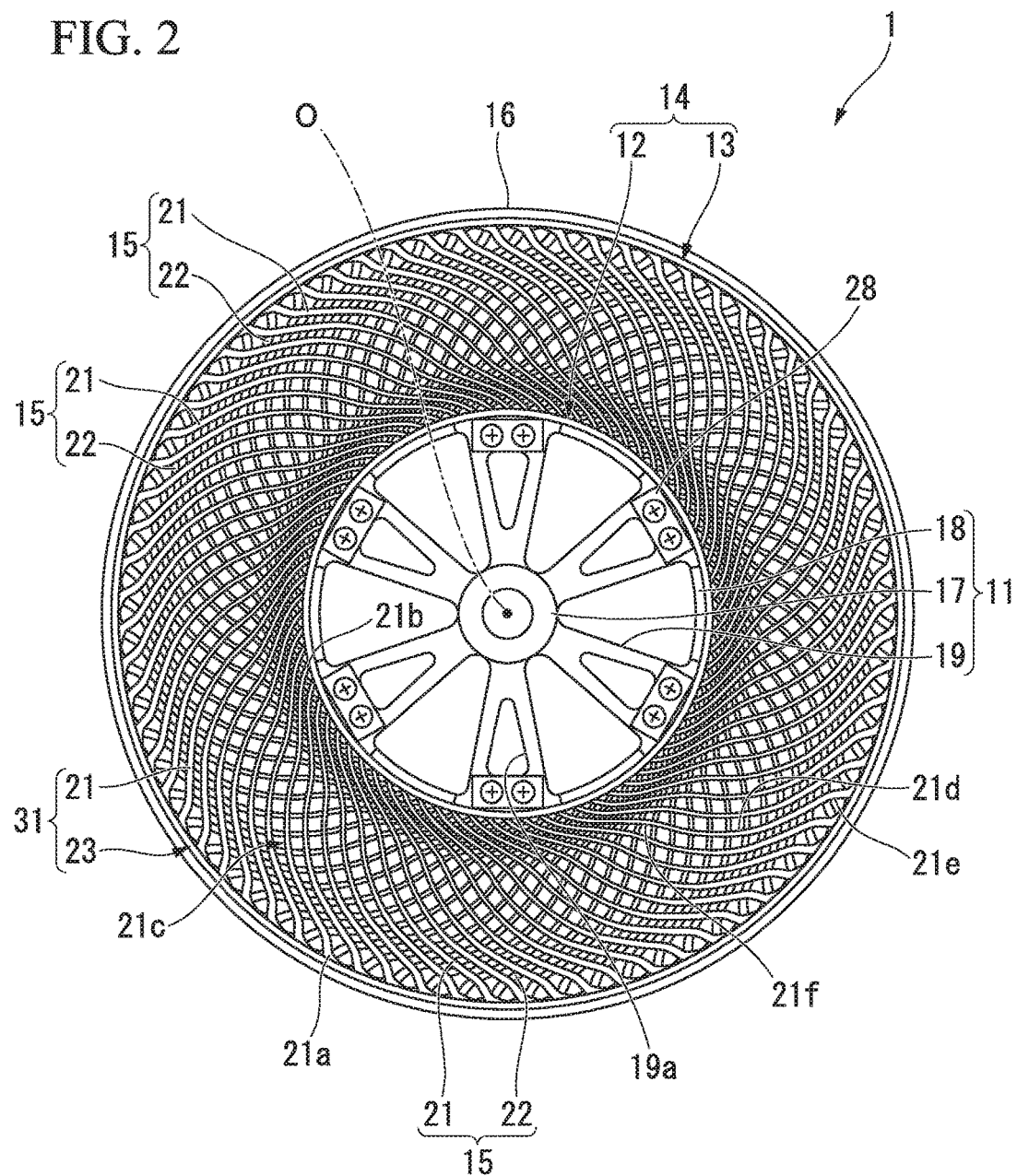
FIG. 2 is a side view of the non-pneumatic tire shown in FIG. 1 when seen from a first side in a tire width direction.

As shown in FIGS. 1 and 2, the attachment body 11 includes a mounting tubular section 17 on which a front end portion of the axle is mounted, an outer ring section 18 configured to surround the mounting tubular section 17 from the outside in the tire radial direction, and a plurality of ribs 19 configured to connect the mounting tubular section 17 and the outer ring section 18.

The mounting tubular section 17, the outer ring section 18 and the ribs 19 are integrally formed of a metal material such as an aluminum alloy or the like. The mounting tubular section 17 and the outer ring section 18 are cylindrically formed and disposed coaxially with the axis O. The plurality of ribs 19 are disposed at equal intervals in the tire circumferential direction.

A plurality of key groove sections 18a recessed inward in the tire radial direction and extending in the tire width direction H are formed at an outer circumferential surface of the outer ring section 18 at intervals in the tire circumferential direction. In the outer circumferential surface of the outer ring section 18, each of the key groove sections 18a is open at only first side out of both ends in the tire width direction H and closed at the second side. The protrusion sections 12a of the inner tubular body 12 in the ring member 14 are fitted into the key groove sections 18a.

Further, among wall surfaces that define the key groove sections 18a, pairs of side wall surfaces opposite to each other in the tire circumferential direction are perpendicular to bottom wall surfaces. In addition, among outer surfaces of the protrusion sections 12a, pairs of side wall surfaces rising from the inner circumferential surface of the inner tubular body 12 are perpendicular to top wall surfaces directed inward in the tire radial direction. The sizes in the tire circumferential direction of the protrusion sections 12a and the key groove sections 18a are equal to each other.

Here, concave sections 18b recessed toward the second side of the tire width direction H and into which plate members 28 are fitted are formed at positions of edges of first side in the tire width direction H in the outer ring section 18 corresponding to the key groove sections 18a. Through-holes are formed in the plate members 28, and among wall surfaces that define the concave sections 18b, female screw sections in communication with the through-holes of the plate members 28 fitted into the concave sections 18b are formed in the wall surfaces directed toward first side in the tire width direction H. Further, a plurality of female screw sections and through-holes are formed at intervals in the tire circumferential direction.

Then, the ring member 14 is fixed to the attachment body 11 by screwing bolts into the female screw sections through the through-holes of the plate members 28 fitted into the concave sections 18b in a state in which the inner tubular body 12 is fitted onto the attachment body 11 and the protrusion sections 12a are fitted into the key groove sections 18a. In this state, the protrusion sections 12a are sandwiched between the plate members 28 and other end wall surfaces disposed at a second end in the tire width direction H and directed toward the first side, among the wall surfaces that define the key groove sections 18a, in the tire width direction H.

Further, a plurality of hole arrays 18c, in each of which a plurality of weight-reduction holes passing in the tire radial direction are disposed at intervals in the tire width direction H, are formed in the tire circumferential direction at intervals at portions of the outer ring section 18 disposed between the key groove sections 18a neighboring in the tire circumferential direction. In addition, weight-reduction holes 19a passing in the tire width direction H are also formed in the ribs 19.

The tread member 16 is formed in a cylindrical shape and integrally covers on the outer circumferential surface side of the outer tubular body 13 of the ring member 14 throughout the region. The tread member 16 is formed of, for example, vulcanized rubber in which natural rubber or/and a rubber composition are vulcanized, a thermoplastic material, or the like. For example, a thermoplastic elastomer, a thermoplastic resin, or the like, is exemplified as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), another thermoplastic elastomer (TPZ), and the like, as defined in Japanese Industrial Standard JIS K6418, are exemplary examples of the thermoplastic elastomer. For example, a urethane resin, an olefin resin, polyvinyl chloride, a polyamide resin, and the like, are exemplary examples of the thermoplastic resin. Further, in view of abrasion resistance, the tread member 16 may be formed of vulcanized rubber.

The connecting members 15 connect the attachment body 11 and the outer tubular body 13 while allowing a relative elastic displacement therebetween. The connecting members 15 are connected to the attachment body 11 via the inner tubular body 12. The connecting members 15 include first elastic connecting plates 21 and second elastic connecting plates 22 that are configured to connect the inner tubular body 12 and the outer tubular body 13 of the ring member 14 to each other.

The plurality of (in the example shown, 60) connecting members 15 are formed in the tire circumferential direction such that a plurality of first elastic connecting plates 21 are disposed in the tire circumferential direction at predetermined positions in the tire width direction H and a plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same positions in the tire width direction H, and the plurality of second elastic connecting plates 22 are disposed in the tire circumferential direction at the same predetermined positions in the tire width direction H spaced apart from the first elastic connecting plates 21 in the tire width direction H.

Further, the plurality of connecting members 15 are disposed between the inner tubular body 12 and the outer tubular body 13 of the ring member 14 at positions that are axially symmetrical with respect to the axis O. In addition, all of the connecting members 15 have the same shape and the same size. Further, the width of the connecting members 15 is smaller than that of the outer tubular body 13.

Additionally, the first elastic connecting plates 21 neighboring in the tire circumferential direction do not come in contact with each other, and the second elastic connecting plates 22 neighboring in the tire circumferential direction do not come in contact with each other either. Further, the first elastic connecting plates 21 and the second elastic connecting plates 22 neighboring them in the tire width direction H do not come in contact with each other either.

Further, widths of the first elastic connecting plates 21 and the second elastic connecting plates 22 are equal to each other. In addition, the thicknesses of the first elastic connecting plates 21 and the second elastic connecting plates 22 are also equal to each other.

Here, first end portions 21a of the first elastic connecting plates 21 connected to the outer tubular body 13 are disposed closer to first side in the tire circumferential direction than the second end portions 21b connected to the inner tubular body 12, and first end portions 22a of the second elastic connecting plates 22 connected to the outer tubular body 13 are disposed closer to the second side in the tire circumferential direction than the second end portions 22b connected to the inner tubular body 12.

In addition, the first end portions 21a and 22a of the first elastic connecting plate 21 and the second elastic connecting plate 22 in each of the connecting members 15 are disposed at different positions in the tire width direction H and connected to the same positions in the tire circumferential direction on the inner circumferential surface of the outer tubular body 13.

In each of the first elastic connecting plates 21 and the second elastic connecting plates 22, a plurality of curved sections 21d to 21f and 22d to 22f curved in the tire circumferential direction are formed at intermediate portions 21c and 22c disposed between the first end portions 21a and 22a and the second end portions 21b and 22b in an extension direction in which the elastic connecting plates 21 and 22 extend, in a tire side view when the tire 1 is seen from the tire width direction H. Further, the curved sections 21d to 21f and 22d to 22f are portions of the first and second elastic connecting plates 21 and 22 having curvatures, respectively, when seen in the tire side view.

In both types of the elastic connecting plates 21 and 22, among the plurality of curved sections 21d to 21f and 22d to 22f, curved directions of the curved sections 21d to 21f and 22d to 22f neighboring in the extension direction are directed in opposite directions.

The plurality of curved sections 21d to 21f formed in the first elastic connecting plates 21 have first curved sections 21d curved to protrude toward the second side in the tire circumferential direction, second curved sections 21e disposed between the first curved sections 21d and the first end portions 21a and curved to protrude toward the first side in the tire circumferential direction, and third curved sections 21f disposed between the first curved sections 21d and the second end portions 21b and curved to protrude toward the first side in the tire circumferential direction.

The plurality of curved sections 22d to 22f formed in the second elastic connecting plates 22 have first curved sections 22d curved to protrude toward the first side in the tire circumferential direction, second curved sections 22e disposed between the first curved sections 22d and the first end portions 22a and curved to protrude toward the second side in the tire circumferential direction, and third curved sections 22f disposed between the first curved sections 22d and the second end portions 22b and curved to protrude toward the second side in the tire circumferential direction.

In the example shown, the first curved sections 21d and 22d have larger radii of curvature in the tire side view than the second curved sections 21e and 22e and the third curved sections 21f and 22f. Further, the first curved sections 21d and 22d are disposed at central portions in the extension direction of the first elastic connecting plates 21 and the second elastic connecting plates 22.

Further, lengths of both types of the elastic connecting plates 21 and 22 are equal to each other, and the second end portions 21b and 22b of both types of the elastic connecting plates 21 and 22 are connected to positions spaced apart by the same angle (for example, 20° to 135°) from the positions opposite to the first end portions 21a and 22a in the tire radial direction at the first side and the second side on the outer circumferential surface of the inner tubular body 12 in the tire circumferential direction around the axis O when seen in the tire side view. In addition, the first curved sections 21d and 22d, the second curved sections 21e and 22e, and the third curved sections 21f and 22f of the first elastic connecting plates 21 and the second elastic connecting plates 22 are directed to protrude in opposite directions in the tire circumferential direction and have the same size.

Figure 4:
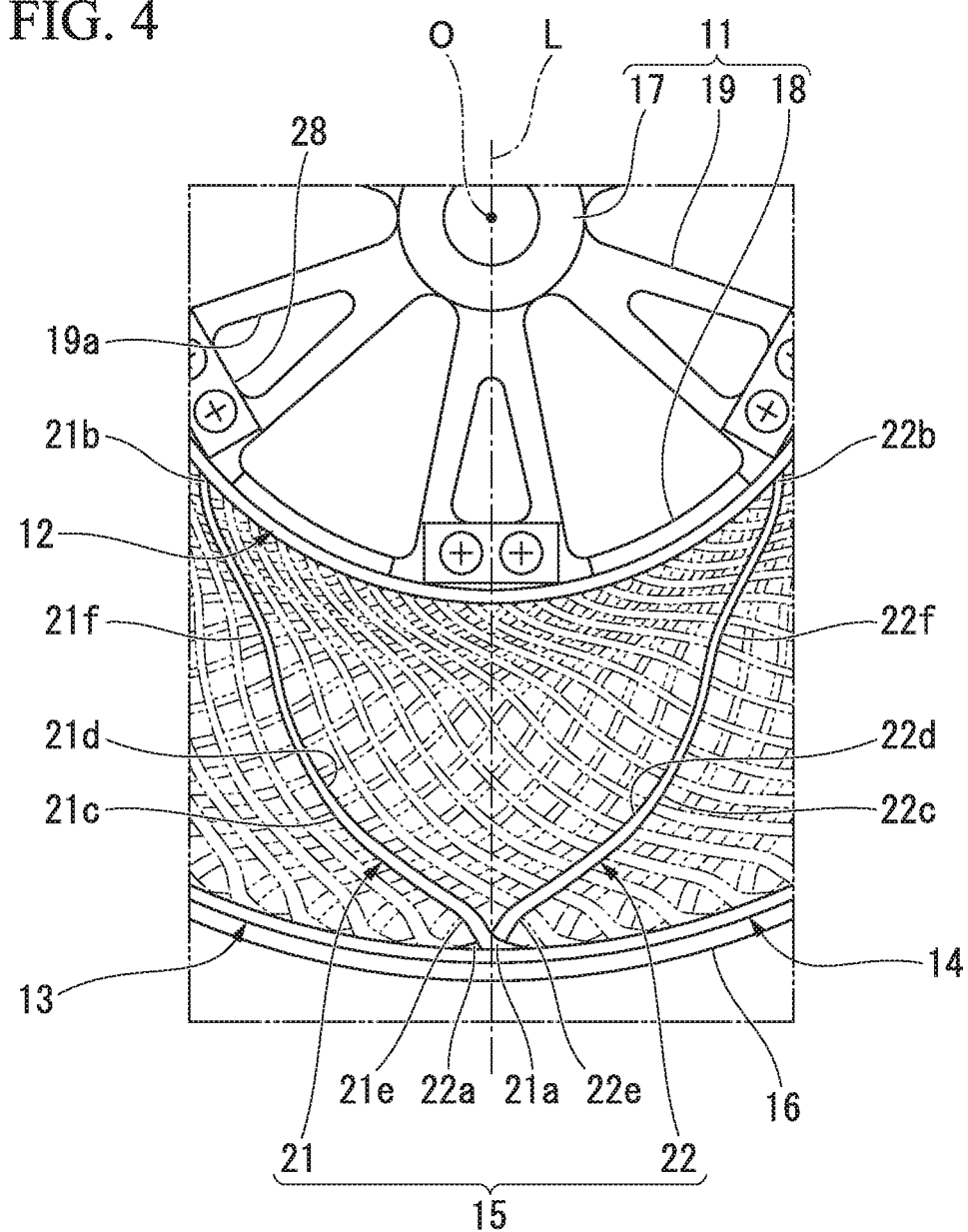
FIG. 4 is an enlarged view showing a major part of FIG. 2.

Accordingly, as shown in FIG. 4, a shape in the tire side view of each of the connecting members 15 is linearly symmetrical with respect to an imaginary line L extending in the tire radial direction and passing through the first end portions 21a and 22a of both types of the elastic connecting plates 21 and 22.

Figure 5:
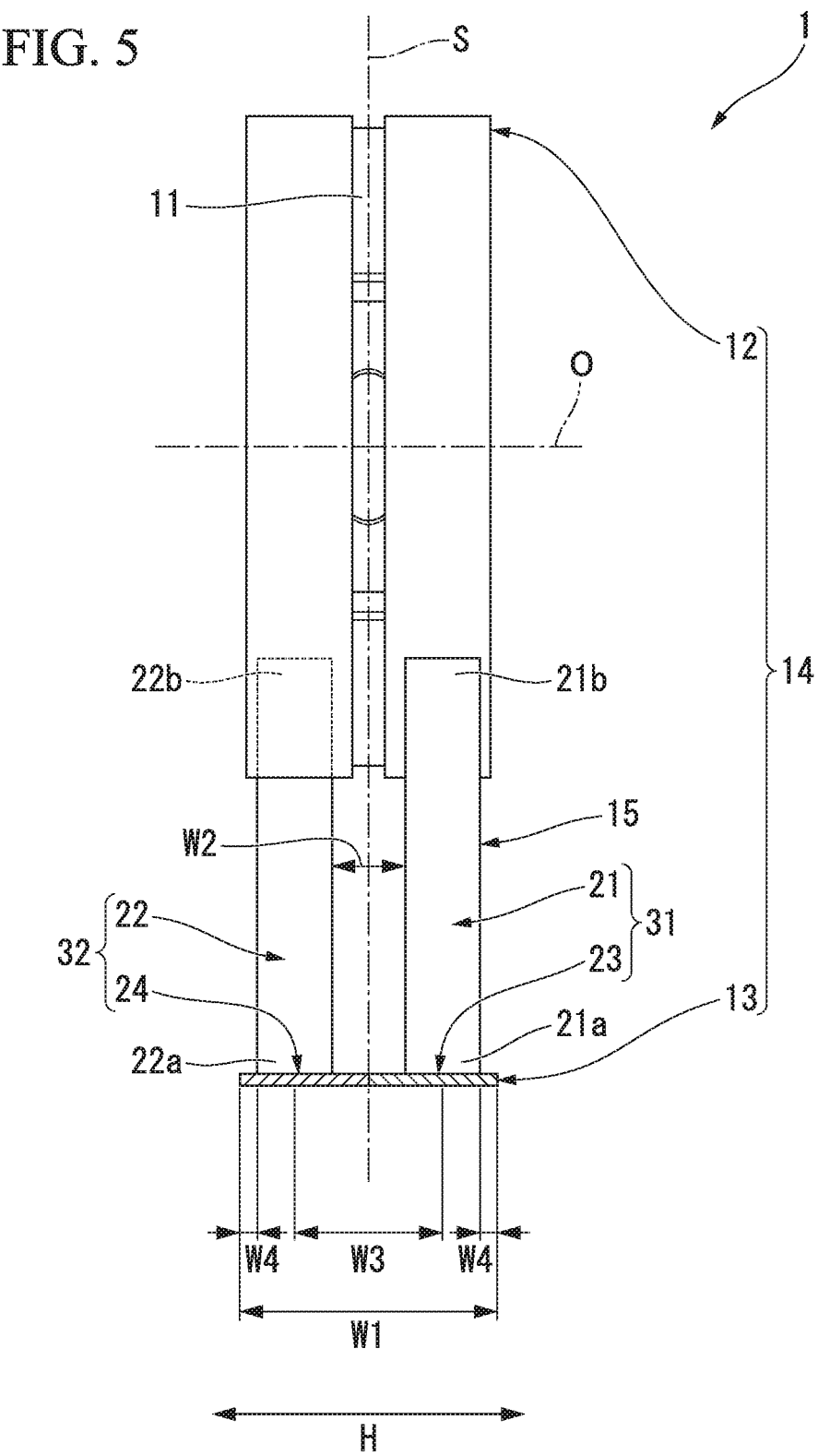
FIG. 5 is a front view showing connecting members that constitute the non-pneumatic tire shown in FIG. 1 when seen from a front side.

As shown in FIG. 5, the central portion in the tire width direction H of the connecting members 15 coincides with the central portion in the tire width direction H of the outer tubular body 13. The connecting members 15 are disposed line-symmetrically with respect to a reference line S perpendicular to the axis O and passing the central portion in the tire width direction H of the outer tubular body 13 in a front view when the connecting members 15 are seen in a direction perpendicular to both of the axis O and the imaginary line L.

A member width serving as a size in the tire width direction H of the connecting member 15 is equal to or smaller than an outer tube width W1 serving as a size in the tire width direction H of the outer tubular body 13, and moreover, in the example shown, equal to or smaller than a size in the tire width direction H of each of the attachment body 11 and the inner tubular body 12. The member width of the connecting member 15 is a distance in the tire width direction H between both edges outside in the tire width direction H of the connecting member 15. The edges outside in the tire width direction H of the connecting member 15 are edges outside in the tire width direction H of both of the elastic connecting plates 21 and 22. Further, in the embodiment, the member width of the connecting member 15 is constant throughout the length of the connecting member 15. Both of the edges outside in the tire width direction H of the connecting member 15 are formed in linear shapes extending in parallel to the reference line S, and smoothly extend with no step difference when seen in the front view.

Sizes in the tire width direction H of both of the elastic connecting plates 21 and 22 are constant throughout the length in the extension direction. Here, in the embodiment, a central portion in the extension direction of the first elastic connecting plate 21 and a central portion in the extension direction of the second elastic connecting plate 22 are spaced apart from each other by the distance of 0.25 to 0.9 times the outer tube width W1 in the tire width direction H, so an interval W2 in the tire width direction H between the central portion of the first elastic connecting plate 21 and the central portion of the second elastic connecting plate 22 is 0.25 W1 to 0.9 W1. Further, in the example shown, in both types of the elastic connecting plates 21 and 22 of the connecting members 15, edges inside in the tire width direction H are spaced apart in the tire width direction H throughout the length from first end portions of the connecting members 15 to arrive at the second end portions, and intervals in the tire width direction H of the edges are constant throughout the lengths of the connecting members 15. When seen in the front view, the edges inside in the tire width direction H of both types of the elastic connecting plates 21 and 22 are formed in a linear shape extending in parallel to the reference line S, and smoothly extend with no step difference.

In addition, in both types of the elastic connecting plates 21 and 22, a distance W3 in the tire width direction H between the central portions in the tire width direction H of the first end portions 21a and 22a is 0.7 times the outer tube width W1 or less, i.e., 0.7W1 or less. Further, load centers of the first end portions 21a and 22a may be disposed on the central portions in the tire width direction H of the first end portions 21a and 22a of the elastic connecting plates 21 and 22, and the load centers may be disposed within a certain range including the central portions of the first end portions 21a and 22a. Here, the load center is a portion at which a maximum load is applied to each of the first end portions 21a and 22a of the elastic connecting plates 21 and 22 when the compressive load in the tire radial direction is applied to the non-pneumatic tire 1.

Further, the edges outside in the tire width direction H of the first end portions 21a and 22a of both types of the elastic connecting plates 21 and 22 are disposed inside in the tire width direction H of the edges outside in the tire width direction H of the outer tubular body 13 within a distance of 0.1 times the outer tube width W1 or less, so a spacing distance W4 in the tire width direction H between the edges of the first end portions 21a and 22a of both of the elastic connecting plates 21 and 22 and the edge of the outer tubular body 13 is 0.1W1 or less. That is, an edge of the first side in the tire width direction H of the first end portion 21a of the first elastic connecting plate 21 is disposed inside in the tire width direction H of an edge of the first side in the tire width direction H of the outer tubular body 13 (hereinafter, referred to as a "first side edge of the outer tubular body 13") within a distance of 0.1 times the outer tube width W1 or less. In addition, an edge of the second side in the tire width direction H of the first end portion 22a of the second elastic connecting plate 22 is disposed inside in the tire width direction H of an edge of the second side in the tire width direction H of the outer tubular body 13 (hereinafter, referred to as "the second side edge of the outer tubular body 13") within a distance of 0.1 times the outer tube width W1 or less. In the example shown, the spacing distance W4 of the first elastic connecting plates 21 is equal to the spacing distance W4 of the second elastic connecting plates 22.

Further, the edges outside in the tire width direction H of the first end portions 21a and 22a of both of the elastic connecting plates 21 and 22 may be disposed at the same positions in the tire width direction H as the edges outside in the tire width direction H of the outer tubular body 13, and the spacing distance W4 may be 0. That is, an edge of first side in the tire width direction H of the first elastic connecting plate 21 may be disposed at the same position in the tire width direction H as the first side edge of the outer tubular body 13 to be flush with the first side edge, and an edge of the second side in the tire width direction H of the second elastic connecting plate 22 may be disposed at the same position in the tire width direction H as the second side edge of the outer tubular body 13 to be flush with the second side edge.

Here, in the embodiment, the ring member 14 and the plurality of connecting members 15 are integrally formed of a synthetic resin material. Further, the synthetic resin material may be only one kind of resin material, a mixture including two or more kinds of resin materials, or a mixture including one or more kinds of resin materials and one or more kinds of elastomers. Further, the synthetic resin material may include additives such as an anti-oxidant, a plasticizing agent, a filler, a pigment, or the like.

Further, in the embodiment, as shown in FIG. 1, the ring member 14 is split into first split ring member 23 disposed at first side in the tire width direction H, and a second split ring member 24 disposed at the second side in the tire width direction H. Further, in the example shown, the ring member 14 is split at a central portion in the tire width direction H.

Additionally, the first split ring member 23 is integrally formed with the first elastic connecting plates 21, and the second split ring member 24 is integrally formed with the second elastic connecting plates 22.

Further, in the embodiment, the first split ring member 23 and the first elastic connecting plates 21 are integrally formed by injection molding, and the second split ring member 24 and the second elastic connecting plates 22 are also integrally formed by injection molding.

Hereinafter, a member formed by integrally forming the first split ring member 23 and the first elastic connecting plates 21 is referred to as a first split case body 31, and a member formed by integrally forming the second split ring member 24 and the second elastic connecting plates 22 is referred to as a second split case body 32.

Here, the injection molding may be a general method of simultaneously forming each of the first and second split case bodies 31 and 32 as a whole or of forming each of the first and second split case bodies 31 and 32, may be insert molding in which one of the first and the second split ring members 23 and 24 and one of the first and second elastic connecting plates 21 and 22 may be formed as an insert part and the others may be formed of injection molding, or may be a so-called two-color formation or the like.

In addition, in each of the first and second split case bodies 31 and 32, the one and the second split ring members 23 and 24 and the first and second elastic connecting plates 21 and 22 may be formed of different materials or may be formed of the same material. Further, the material may be a metal material, a resin material, or the like, or may be a resin material, in particular, a thermoplastic resin, in view of a reduction in weight.

Further, when each of the first and second split case bodies 31 and 32 is simultaneously formed by injection molding as a whole, the plurality of protrusion sections 12a formed at the inner tubular body 12 may be a gate portion.

In each of the first and second split case bodies 31 and 32, central portions in the tire width direction H of the first and second elastic connecting plates 21 and 22 coincide with a central portion in the tire width direction H of the outer tubular body 13, and the inner tubular body 12 has a width smaller than that of the outer tubular body 13.

Additionally, edges in the tire width direction H of the outer tubular body 13 of the first split ring member 23 and the outer tubular body 13 of the second split ring member 24 are connected by, for example, welding, fusion, adhesion, or the like. Further, among these, in the case of welding, for example, hot plate welding or the like may be employed.

In addition, edges in the tire width direction H of the inner tubular body 12 of the first split ring member 23 and the inner tubular body 12 of the second split ring member 24 are separated from each other in the tire width direction H. Accordingly, the generation of burrs on the inner circumferential surface of the inner tubular body 12 fitted onto the attachment body 11 is prevented.

Figure 3:
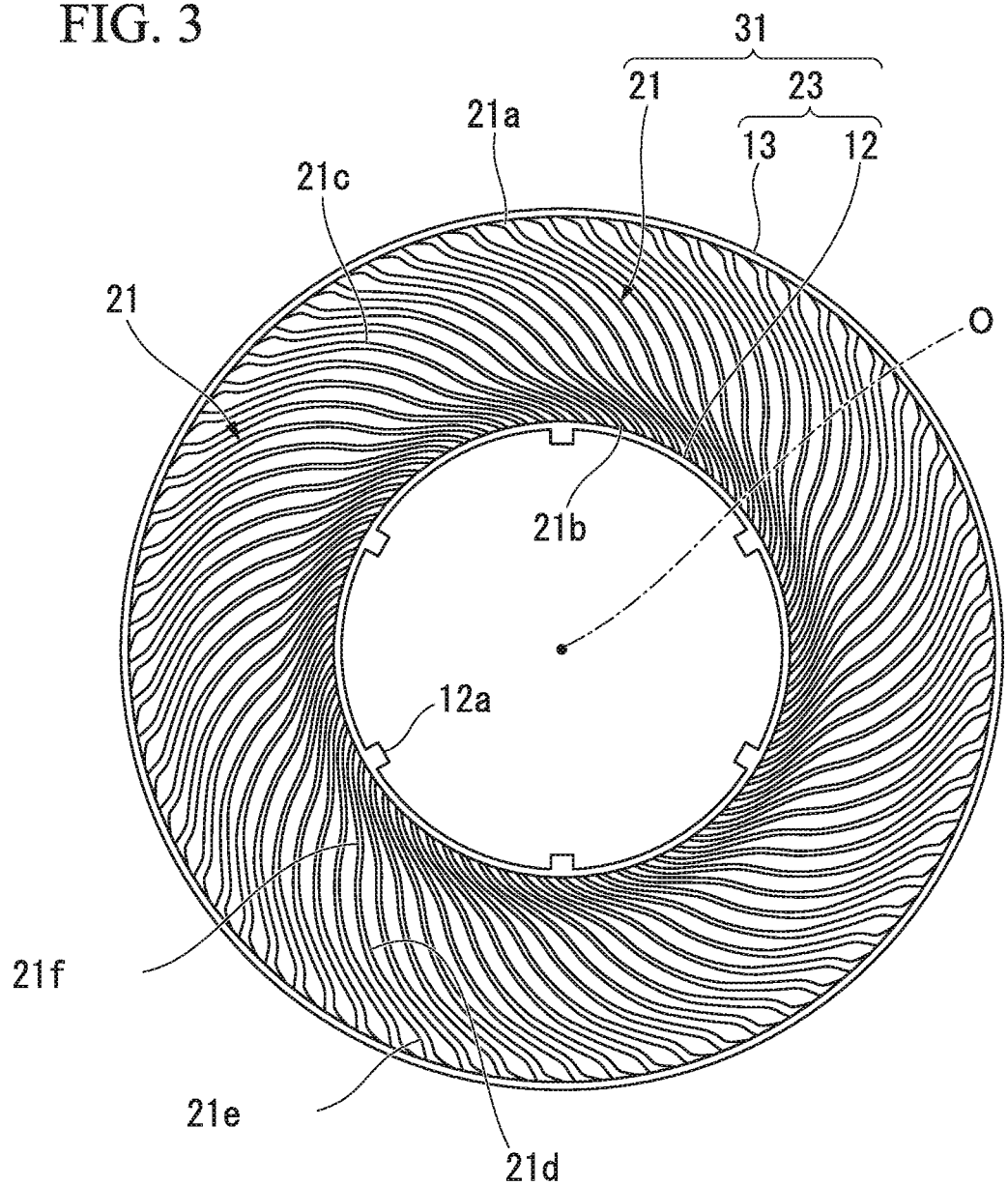
FIG. 3 is a side view of a first split case body when seen from the first side in the tire width direction in the non-pneumatic tire shown in FIG. 1; a side view of a second split case body is identical.

In addition, the first split case body 31 and the second split case body 32 have the same shape and the same size as shown in FIG. 3 in a state before these case bodies 31 and 32 are connected as described above.

In addition, when they are connected as described above, the non-pneumatic tire 1 is obtained by abutting and connecting the edges in the tire width direction H of the outer tubular bodies 13 of the first split case body 31 and the second split case body 32 such that the connecting members 15 are line-symmetrical as described above in the tire side view when in a state in which orientations in the tire width direction H of both of the split case bodies 31 and 32 are opposite to each other while matching positions in the tire circumferential direction of the first split case body 31 and the second split case body 32.

As described above, according to the non-pneumatic tire 1 of the embodiment, since the central portion of the first elastic connecting plate 21 and the central portion of the second elastic connecting plate 22 are spaced apart from each other in the tire width direction H by a distance of 0.25 to 0.9 times the outer tube width W1, both of the elastic connecting plates 21 and 22 can be limited from cushioning each other when they are deformed, and an increase in weight of the non-pneumatic tire 1 can be limited while increasing lateral stiffness serving as stiffness in the tire width direction H of the connecting member 15. That is, when the interval W2 in the tire width direction H between the central portion of the first elastic connecting plate 21 and the central portion of the second elastic connecting plate 22 is smaller than 0.25 times the outer tube width W1, the member width of the connecting member 15 cannot be easily secured, and an increase in lateral stiffness of the connecting member 15 may become difficult. In addition, when the interval W2 is larger than 0.9 times the outer tube width W1 in the tire width direction H, the member width of the connecting member 15 is excessively large, and limitation of an increase in weight of the non-pneumatic tire 1 may become difficult.

Here, as the increase in weight of the non-pneumatic tire 1 is limited while increasing lateral stiffness of the connecting member 15, the cornering force generated upon cornering of the non-pneumatic tire 1 can be easily received by the connecting members 15.

Further, in the non-pneumatic tire 1, the edge of the first side in the tire width direction H of the first end portion 21a of the first elastic connecting plate 21 is disposed at the same position in the tire width direction H as the first side edge of the outer tubular body 13, or disposed inside in the tire width direction H of the first side edge of the outer tubular body 13 within a distance of 0.1 times the outer tube width W1 or less. Moreover, the edge of the second side in the tire width direction H of the first end portion 22a of the second elastic connecting plate 22 is disposed at the same position in the tire width direction H as the second side edge of the outer tubular body 13, or disposed inside in the tire width direction H of the second side edge of the outer tubular body 13 within a distance of 0.1 times the outer tube width W1 or less.

Accordingly, when the non-pneumatic tire 1 corners and a camber is input, stress occurring at the first end portions 21a and 22a of both of the elastic connecting plates 21 and 22 can be limited. That is, when the first end portions 21a and 22a of the first elastic connecting plate 21 and the second elastic connecting plate 22 overhang the first side edge or the second side edge of the outer tubular body 13 outward in the tire width direction H and cambers are directly input into the first end portions 21a and 22a, and stress occurring at the first end portions 21a and 22a may be significantly increased. In addition, when the first end portions 21a and 22a of the first elastic connecting plate 21 and the second elastic connecting plate 22 are spaced apart from the first side edge or the second side edge of the outer tubular body 13 by a distance larger than 0.1 times the outer tube width W1 in the tire width direction H, the occurrence of stress concentration places may be easily formed in the first end portions 21a and 22a.

Additionally, since the stress occurring at the first end portions 21a and 22a of the elastic connecting plates 21 and 22 upon cornering can be limited in the way described above, in combination with an easy reception of the cornering force occurring upon cornering by the connecting member 15, for example, a posture of the non-pneumatic tire 1 upon cornering or the like can be stabilized, and cornering performance can be improved.

Figure 6:
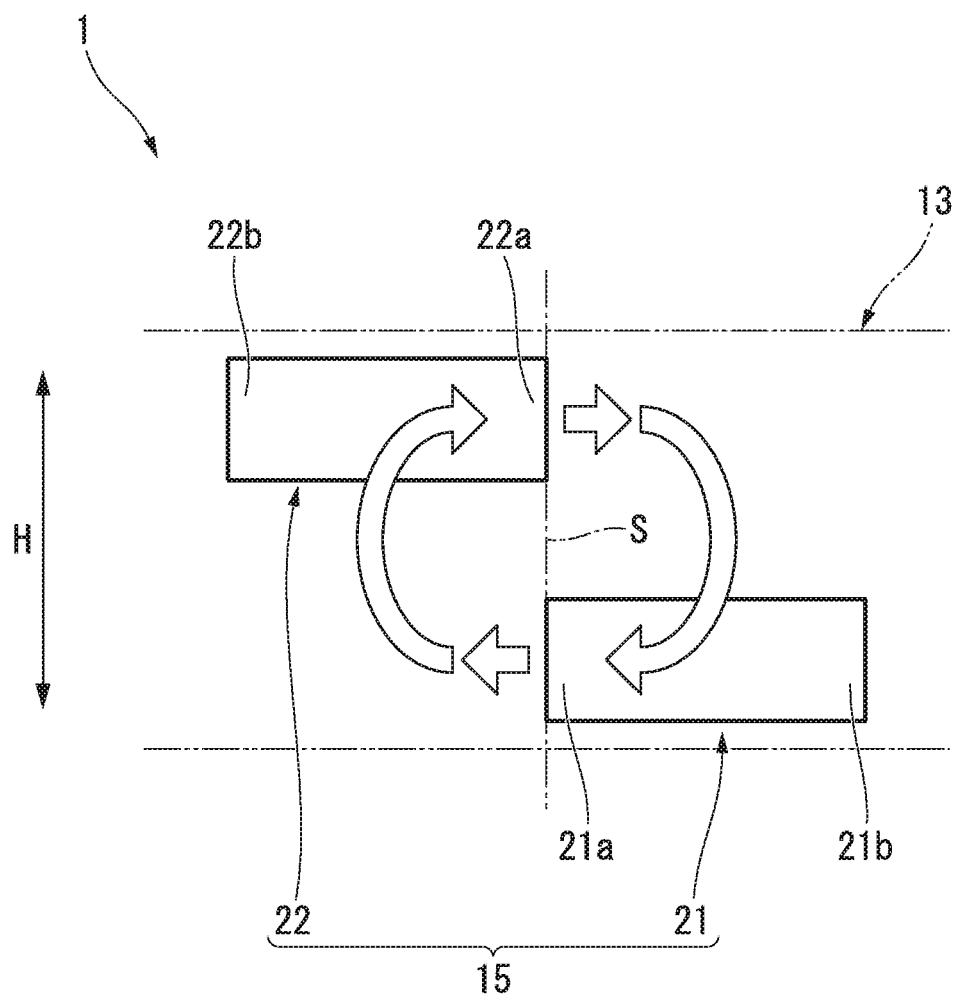
FIG. 6 is a view for describing an action of the non-pneumatic tire shown in FIG. 1, and a schematic view showing a state in which a portion of an outer tubular body connected to the connecting member is seen from the inside in a tire radial direction.

In addition, since both of the elastic connecting plates 21 and 22 extend in the tire circumferential direction to be directed in opposite directions while extending from the outer tubular body 13 inward in the tire radial direction, when the compressive load in the tire radial direction is applied to the non-pneumatic tire 1 upon traveling of the non-pneumatic tire 1 and the connecting member 15 is compressed and deformed in the tire radial direction, as shown in FIG. 6, a force is applied to the outer tubular body 13 from each of the first end portions 21a and 22a of both of the elastic connecting plates 21 and 22 toward an opposite side in the tire circumferential direction. Here, since both of the elastic connecting plates 21 and 22 are disposed at different positions in the tire width direction H, as the above-mentioned force is applied from each of the first end portions 21a and 22a of both of the elastic connecting plates 21 and 22 to the outer tubular body 13, a moment around the reference line S (an axis extending in the tire radial direction) is generated at a portion of the outer tubular body 13 to which the connecting member 15 is connected.

The inventor(s) of the present invention has found that the above-mentioned moment is generated at the non-pneumatic tire 1, and the moment generates an unintended lateral force during traveling of the non-pneumatic tire 1.

Here, in both types of the elastic connecting plates 21 and 22, the distance W3 in the tire width direction H between the central portions in the tire width direction H of the first end portions 21a and 22a connected to the outer tubular body 13 is 0.7 times the outer tube width W1 or less. Accordingly, generation of the above-mentioned moment can be limited without a complex structure, and linearity of the non-pneumatic tire 1 can be increased to improve steering stability.

Accordingly, not only cornering performance but also linearity can be improved, and steering stability of the non-pneumatic tire 1 can be reliably improved.

Second Embodiment

Next, a non-pneumatic tire according to a second embodiment of the present invention will be described with reference to FIG. 7.

Further, in the second embodiment, the same portions as the components of the first embodiment will be designated by the same reference numerals, a description thereof will be omitted, and only differences will be described.

Figure 7:
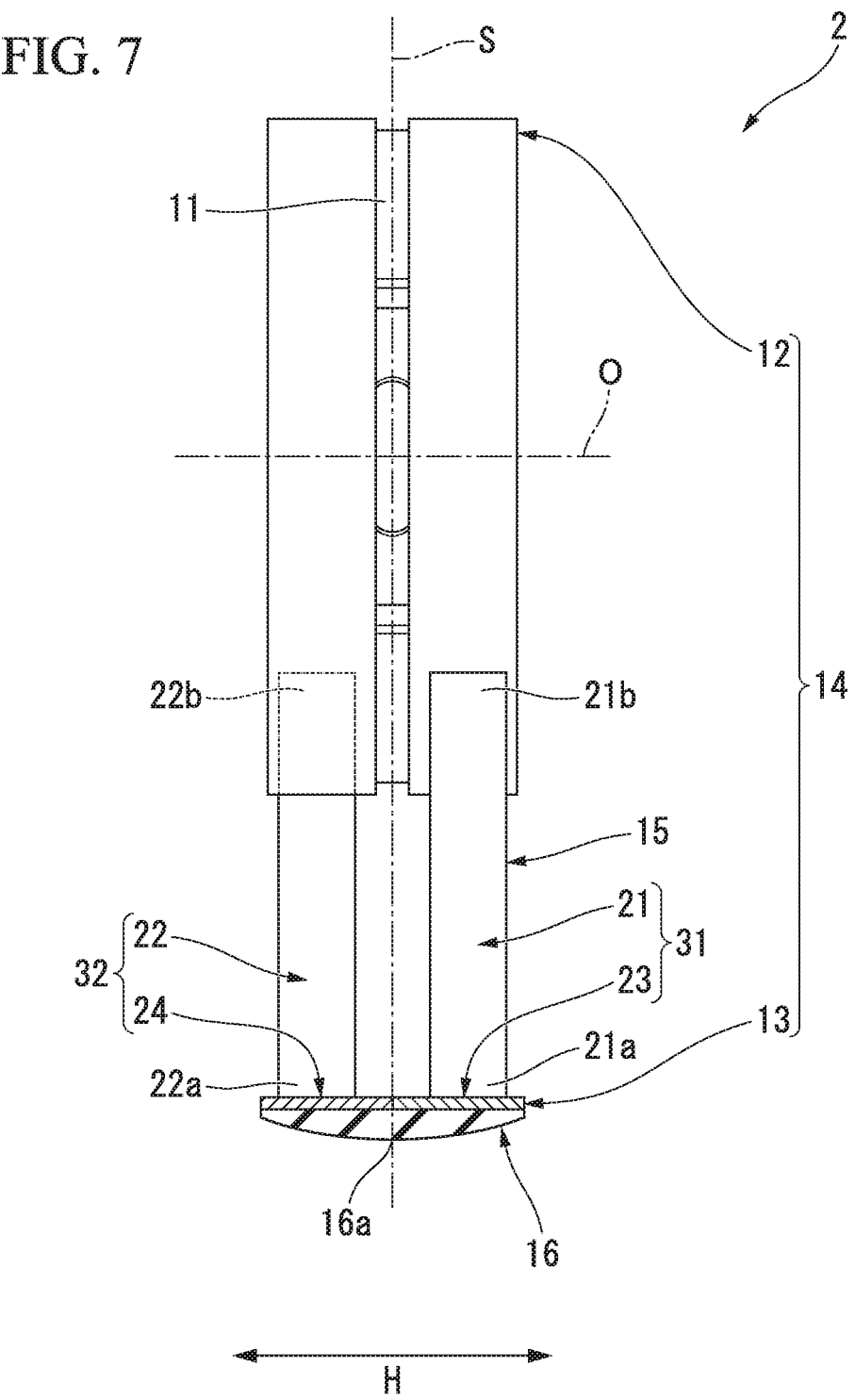
FIG. 7 is a front view showing connecting members that constitute a non-pneumatic tire of a second embodiment according to the present invention when seen from a front side.

In a non-pneumatic tire 2 of the embodiment, as shown in FIG. 7, an outer circumferential surface of the tread member 16 forms a convex shape protruding outward in the tire radial direction when seen in a cross-sectional view in the tire width direction H, and an outer diameter of the tread member 16 is gradually reduced as it recedes from a maximum outer diameter portion 16a thereof in the tire width direction H. Further, an outer diameter of the tread member 16 is a distance in the tire radial direction between the outer circumferential surface of the tread member 16 and the axis O. The maximum outer diameter portion 16a of the tread member 16 is disposed at the central portion in the tire width direction H of the non-pneumatic tire 1.

Further, in the embodiment, the first end portions 21a and 22a of the first elastic connecting plate 21 and the second elastic connecting plate 22 are connected at positions in the tread member 16 deviated from the maximum outer diameter portion 16a in the tire width direction H. In the example shown, the first end portions 21a and 22a of the first and second elastic connecting plates 21 and 22 are connected to positions on the inner circumferential surface of the outer tubular body 13 to interpose the maximum outer diameter portion 16a of the tread member 16 between both sides in the tire width direction H.

As described above, according to the non-pneumatic tire 2 of the embodiment, since the outer circumferential surface of the tread member 16 forms a curved surface shape protruding outward in the tire radial direction when seen in a cross-sectional view in the tire width direction H and a large force is easily applied to the end portion of the outer tubular body 13 when camber is input, an effect of improving the above-mentioned cornering performance can be remarkably achieved.

Third Embodiment

Figure 8:
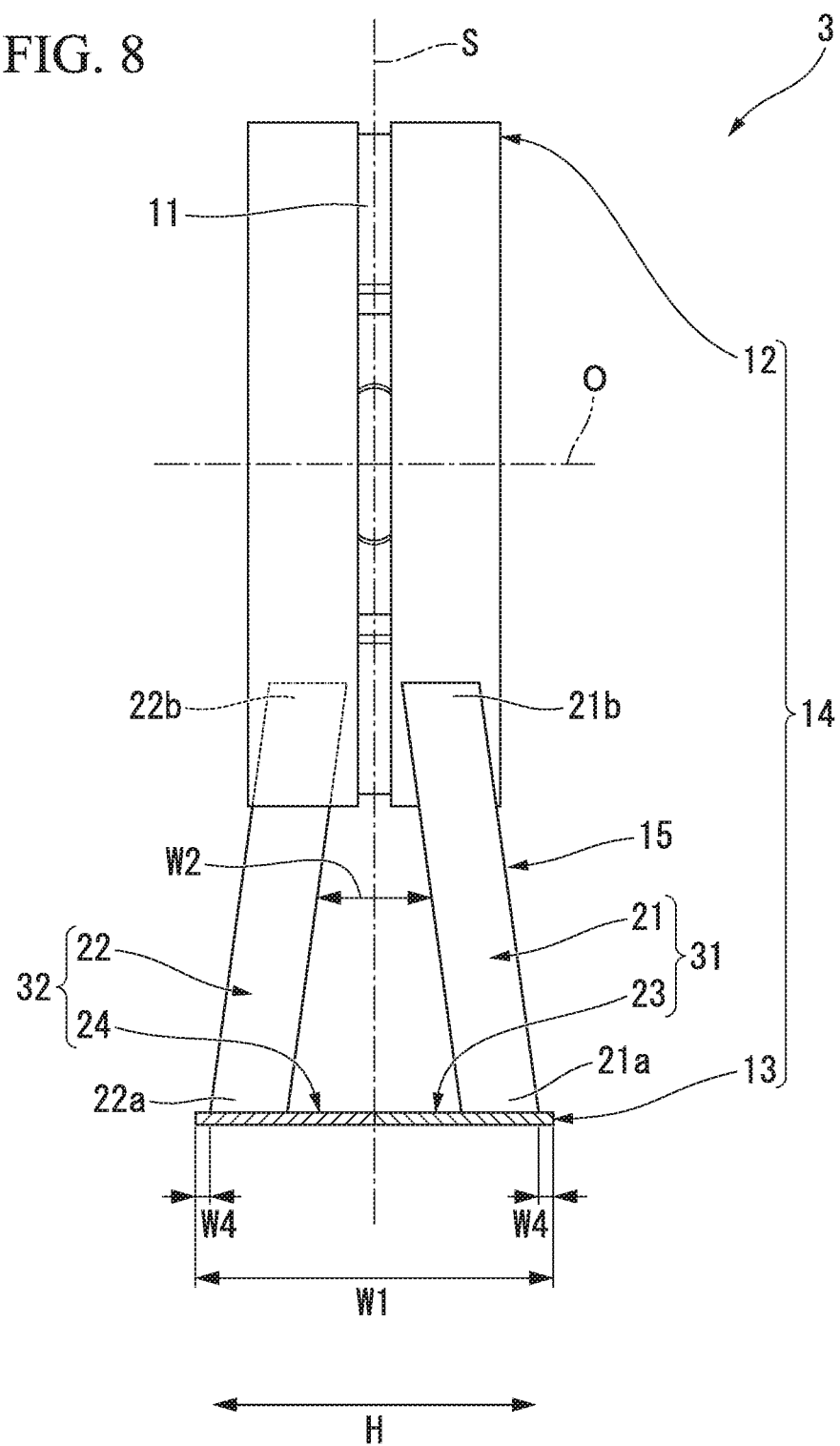
FIG. 8 is a front view showing connecting members that constitute a non-pneumatic tire of a third embodiment according to the present invention when seen from a front side.

Next, a non-pneumatic tire according to a third embodiment of the present invention will be described with reference to FIG. 8.

Further, in the third embodiment, the same portions as the components of the first embodiment will be designated by the same reference numerals, a description thereof will be omitted, and only differences will be described.

In a non-pneumatic tire 3 of the embodiment, each of both types of the elastic connecting plates 21 and 22 extends outward in the tire width direction H from the attachment body 11 toward the outer tubular body 13. Edges outside in the tire width direction H of each of both types of the elastic connecting plates 21 and 22 are formed in linear shapes inclined with respect to the reference line S when seen in the front view. A member width of the connecting member 15 is gradually increased from the second end portion of the connecting member 15 connected to the attachment body 11 toward the first end portion thereof connected to the outer tubular body 13. Both edges outside in the tire width direction H of the connecting member 15 are gradually directed outward in the tire width direction H and smoothly extend with no step difference from the second end portion to the first end portion of the connecting member 15.

As described above, according to the non-pneumatic tire 3 of the embodiment, each of both types of the elastic connecting plates 21 and 22 extends outward in the tire width direction H from the attachment body 11 toward the outer tubular body 13. For this reason, for example, a force applied to the end portion of the outer tubular body 13 when camber is input can be easily received by the connecting members 15 based on the shapes of the elastic connecting plates 21 and 22, and the cornering performance can be further improved.

Further, the technical scope of the present invention is not limited to the embodiments but various modifications may be made without departing from the spirit of the present invention.

For example, instead of the embodiment, the second end portions 21b and 22b of the first elastic connecting plate 21 and the second elastic connecting plate 22 may be connected to, for example, opposite positions on the outer circumferential surface of the inner tubular body 12 with the axis O interposed therebetween in the tire radial direction, or may be connected to positions on the outer circumferential surface of the inner tubular body 12 opposite to the first end portions 21a and 22a of first elastic connecting plate 21 and the second elastic connecting plate 22 in the tire radial direction, or the like.

In addition, instead of the embodiment, the first end portions 21a and 22a of both of the elastic connecting plates 21 and 22 may be connected to the inner circumferential surface of the outer tubular body 13 at different positions in the tire circumferential direction.

Further, a gap in the tire width direction H may not be formed between the inner tubular body 12 of the first split ring member 23 and the inner tubular body 12 of the second split ring member 24.

In addition, the ring member 14 may be split into three or more parts in the tire width direction H, or may not be split.

In addition, the ring member 14 and the plurality of connecting members 15 may not be integrally formed with each other.

Furthermore, the ring member 14 and the connecting members 15 are not limited to those described in the embodiment. For example, the outer tubular body and the attachment body may be directly connected via the connecting members without the inner tubular body while allowing a relative elastic displacement therebetween.

In addition, in both types of the elastic connecting plates 21 and 22, the distance W3 in the tire width direction H between the central portions in the tire width direction H of the first end portions 21a and 22a may not be 0.7 times the outer tube width W1 or less.

Fourth Embodiment

Next, a non-pneumatic tire according to a fourth embodiment of the present invention will be described with reference to FIGS. 9 and 10.

Further, in the second embodiment, the same portions as the components of the first embodiment will be designated by the same reference numerals, a description thereof will be omitted, and only differences will be described.

Figure 9:
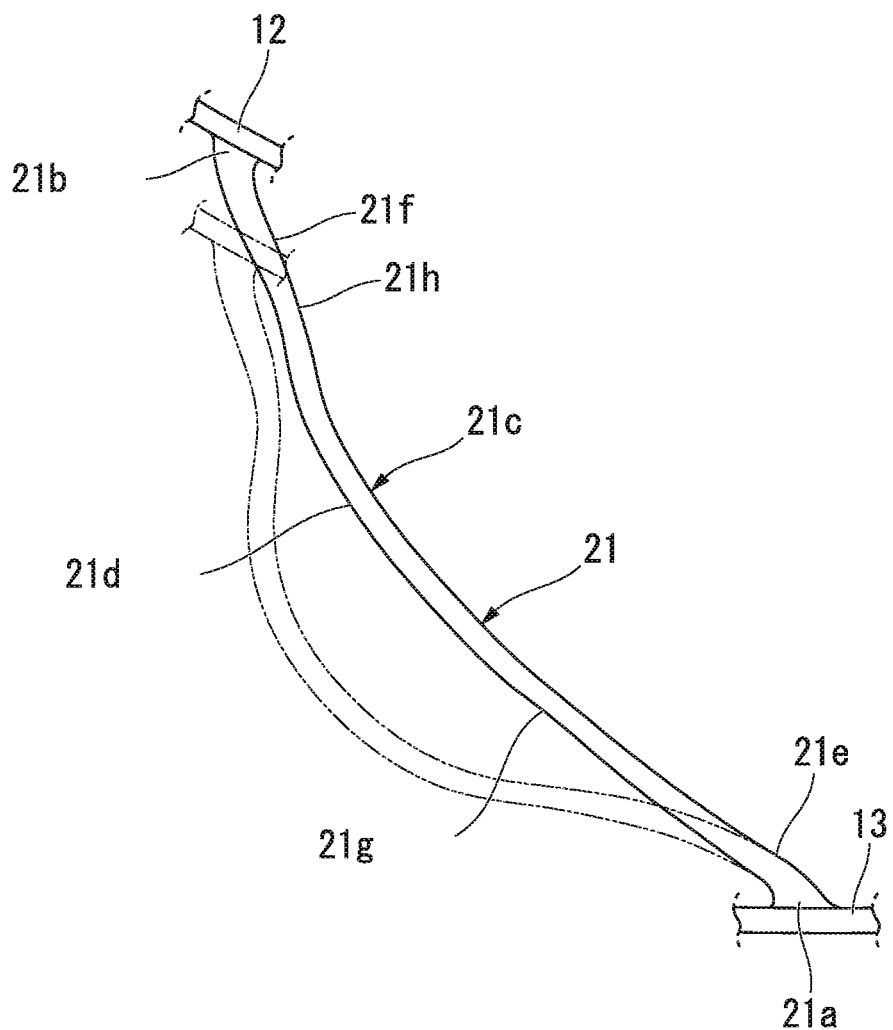
FIG. 9 is an enlarged view showing portions of a first split case body that constitutes a non-pneumatic tire of a fourth embodiment according to the present invention; the second split case body is identical.
Figure 10:
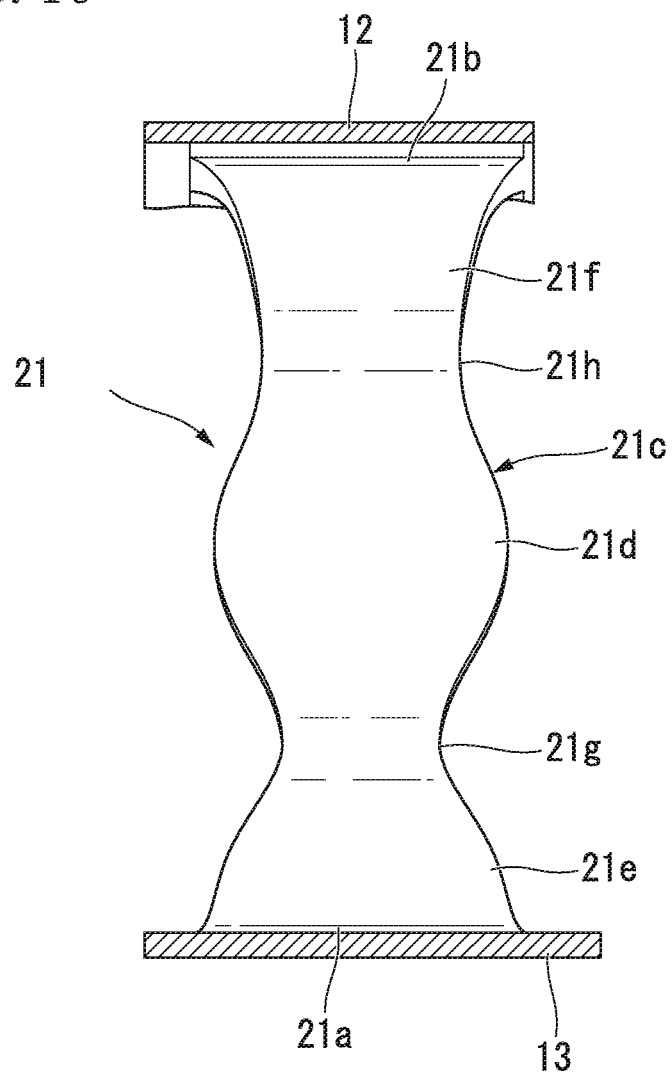
FIG. 10 is a plan view of the portion of the first split case body of FIG. 9 when seen from the second side in a tire circumferential direction; the second split case body is identical.

As shown in FIGS. 9 and 10, in the non-pneumatic tire of the embodiment, in both types of the elastic connecting plates 21 and 22, an area of a cross section of inflection sections 21g, 21h, 22g and 22h disposed between the curved sections 21d to 21f and 22d to 22f neighboring in the extension direction perpendicular to the extension direction, i.e., a cross-sectional area, is smaller than that of the other portions. Further, the inflection sections 21g, 21h, 22g and 22h of both types of the elastic connecting plates 21 and 22 are boundary regions of the curved sections 21d to 21f and 22d to 22f neighboring in the extension direction, and are regions in which curved directions of the curved sections 21d to 21f and 22d to 22f neighboring each other are switched when seen in the tire side view.

In the example shown, cross-sectional areas of both types of the elastic connecting plates 21 and 22 are gradually reduced toward the inflection sections 21g, 21h, 22g and 22h in the extension direction.

In addition, in both types of the elastic connecting plates 21 and 22, sizes of the inflection sections 21g, 21h, 22g and 22h in both the tire width direction H and the tire circumferential direction are smaller than those of other portions.

As shown in FIG. 10, in both types of the elastic connecting plates 21 and 22, both edges in the tire width direction H are bent in the tire width direction H to gradually approach each other toward the inflection sections 21g, 21h, 22g and 22h in the extension direction. In addition, both of the edges in the tire width direction H of both types of the elastic connecting plates 21 and 22 are formed in curved shapes that continuously extend without corners or stepped sections throughout the length in the extension direction. Further, only one out of both of the edges in the tire width direction H in both types of the elastic connecting plates 21 and 22 may be formed in the curved shapes as described above.

Sizes in the tire width direction H of both types of the elastic connecting plates 21 and 22 are gradually reduced toward the inflection sections 21g, 21h, 22g and 22h from the first end portions 21a and 22a and the second end portions 21b and 22b, and are gradually reduced from centers in the extension direction of the first curved sections 21d and 22d toward the inflection sections 21g, 21h, 22g and 22h, respectively. In addition, sizes in the tire width direction H of both types of the elastic connecting plates 21 and 22 are equal to each other in the centers of the extension direction of the first end portions 21a and 22a, the second end portions 21b and 22b, and the first curved sections 21d and 22d.

As shown in FIG. 9, in both types of the elastic connecting plates 21 and 22, the sizes in the tire circumferential direction, i.e., the thicknesses of the inflection sections 21g, 21h, 22g and 22h, are smallest. In both types of the elastic connecting plates 21 and 22, the thickness of each of the first end portions 21a and 22a and the second end portions 21b and 22b is largest, and then the thicknesses of the first curved sections 21d and 22d are the next largest.

The first to third the curved sections 21d to 21f and 22d to 22f and the inflection sections 21g, 21h, 22g and 22h are smoothly connected in the extension direction without intervening corners or stepped sections in the tire side view.

As described above, according to the non-pneumatic tire of the embodiment, in the first and second elastic connecting plates 21 and 22, among the plurality of curved sections 21d to 21f and 22d to 22f, curved directions of the curved sections 21d to 21f and 22d to 22f neighboring in the extension direction are opposite to each other. For this reason, as shown by a two-dot chain line in FIG. 5, when a compressive load in the tire radial direction is applied to the non-pneumatic tire 1, since the inflection sections 21g, 21h, 22g and 22h cannot be easily deformed but are mainly displaced in the first and second elastic connecting plates 21 and 22, loads applied to the inflection sections 21g, 21h, 22g and 22h can be limited in comparison with the other portions.

Additionally, since cross-sectional areas of the inflection sections 21g, 21h, 22g and 22h are smaller than cross-sectional areas of the other portions of the first and second elastic connecting plates 21 and 22 except for the inflection sections 21g, 21h, 22g and 22h, a reduction in weight can be achieved while preventing a decrease in strength of the connecting member 15.

In addition, since the cross-sectional areas of the first and second elastic connecting plates 21 and 22 are gradually reduced toward the inflection sections 21g, 21h, 22g and 22h in the extension direction, a reduction in weight can be effectively achieved while limiting the occurrence of stress concentration places in the first and second elastic connecting plates 21 and 22.

In addition, since both of a size in the tire width direction H and a size in the tire circumferential direction of the first and second elastic connecting plates 21 and 22 are smaller than those of the other portions of the inflection sections 21g, 21h, 22g and 22h, the non-pneumatic tire 1 that exhibits the above-mentioned effects can be reliably obtained.

Further, in a variant of the present invention, the cross-sectional area of each of both types of the elastic connecting plates 21 and 22 may be reduced in only the inflection sections 21g, 21h, 22g and 22h of both types of the elastic connecting plates 21 and 22.

In addition, in the embodiment, while both of the size in the tire width direction H and the size in the tire circumferential direction of both of the elastic connecting plates 21 and 22 are smaller than those of other portions of the inflection sections 21g, 21h, 22g and 22h, only one thereof may be smaller.

In addition, in each of both types of the elastic connecting plates 21 and 22, as holes passing in the tire circumferential direction are formed in the inflection sections 21g, 21h, 22g and 22h, cross-sectional areas of the inflection sections 21g, 21h, 22g and 22h may be smaller than the other portions.

Fifth Embodiment

Figure 11:
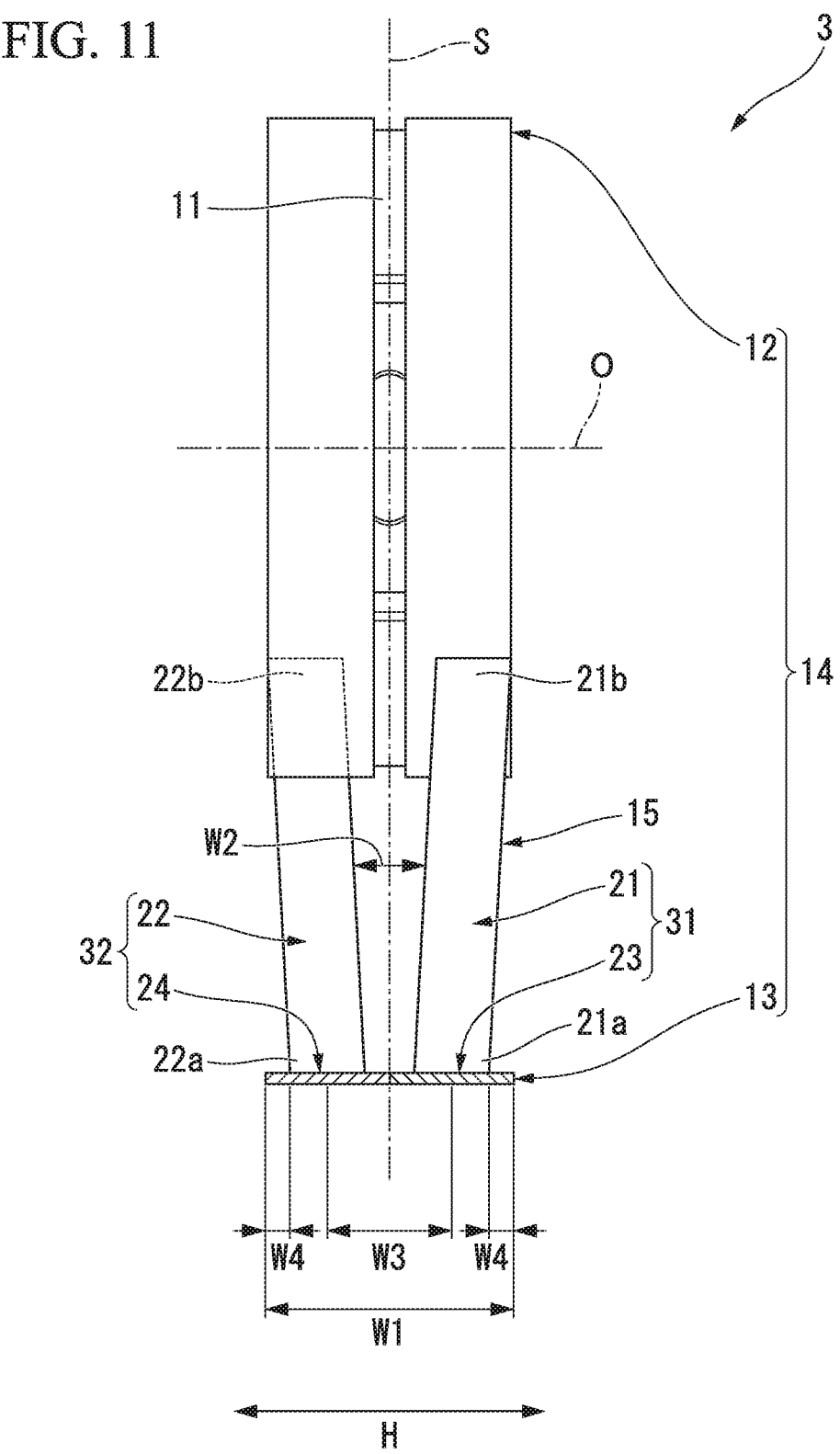
FIG. 11 is a front view of connecting members that constitute a non-pneumatic tire of a fifth embodiment according to the present invention when seen from a front side.

Next, a non-pneumatic tire according to a third embodiment of the present invention will be described with reference to FIG. 11.

Further, in the third embodiment, the same portions as the components of the first embodiment will be designated by the same reference numerals, a description thereof will be omitted, and only differences will be described.

In the non-pneumatic tire 3 of the embodiment, both types of the elastic connecting plates 21 and 22 extend outward in the tire width direction H from the outer tubular body 13 toward the attachment body 11. Edges outside in the tire width direction H of both types of the elastic connecting plates 21 and 22 are formed in linear shapes inclined with respect to the reference line S when seen in the front view. The member width of the connecting member 15 is gradually increased from a first end portion of the connecting member 15 connected to the outer tubular body 13 toward the second end portion connected to the attachment body 11. Both of the edges outside in the tire width direction H of the connecting member 15 are gradually directed outward in the tire width direction H and smoothly extend with no step difference from the first end portion toward the second end portion of the connecting member 15.

As described above, according to the non-pneumatic tire 3 of the present invention, since both types of the elastic connecting plates 21 and 22 extend outward in the tire width direction H from the outer tubular body 13 toward the attachment body 11, the member width of the connecting member 15 can be easily secured while suppressing the generation of the above-mentioned moment. Accordingly, the lateral stiffness of the connecting member 15 can be improved, and the steering stability of the non-pneumatic tire 3 can be further improved.

Further, the technical scope of the present invention is not limited to the embodiments but various modifications may be made without departing from the spirit of the present invention.

For example, the plurality of connecting members 15 may be formed between the inner tubular body 12 and the outer tubular body 13 in the tire width direction H.

In addition, instead of the embodiment, for example, the second end portions 21b and 22b of the first elastic connecting plate 21 and the second elastic connecting plate 22 may be connected to positions opposite to each other on the outer circumferential surface of the inner tubular body 12 with the axis O interposed therebetween in the tire radial direction, or may be connected to positions on the outer circumferential surface of the inner tubular body 12 opposite to the first end portions 21a and 22a of the first elastic connecting plate 21 and the second elastic connecting plate 22 in the tire radial direction, or the like.

In addition, instead of the embodiment, the first end portions 21a and 22a of both of the elastic connecting plates 21 and 22 may be connected to different positions in the tire circumferential direction on the inner circumferential surface of the outer tubular body 13.

Further, a gap in the tire width direction H may not be formed between the inner tubular body 12 of the first split ring member 23 and the inner tubular body 12 of the second split ring member 24.

In addition, the ring member 14 may be split into three or more parts in the tire width direction H, or may not be split.

In addition, the ring member 14 and the plurality of connecting members 15 may not be integrally formed with each other.

Furthermore, the ring member 14 and the connecting members 15 are not limited to the embodiment. For example, the outer tubular body and the attachment body may be directly connected via the connecting members while allowing a relative elastic displacement therebetween without the inner tubular body.

In addition, the central portion in the extension direction of the first elastic connecting plate 21 and the central portion in the extension direction of the second elastic connecting plate 22 may not be separated in the tire width direction H by a distance of 0.25 to 0.9 times the outer tube width W1.

Further, an edge of first side in the tire width direction H of the first end portion 21a of the first elastic connecting plate 21 may not be disposed at the same position in the tire width direction H as first side edge of the outer tubular body 13, or may be disposed inside in the tire width direction H of the first side edge within a distance of 0.1 times the outer tube width W1 or less. Furthermore, an edge of the second side in the tire width direction H of the first end portion 22a of the second elastic connecting plate 22 may not be formed at the same position in the tire width direction H as the second side edge of the outer tubular body 13, or may not be disposed inside in the tire width direction H of the second side edge within a distance of 0.1 times the outer tube width W1 or less.

In addition, the components of the above-mentioned embodiments may be appropriately substituted with known components, and the above-mentioned variants may be appropriately combined without departing from the spirit of the present invention.

INDUSTRIAL APPLICABILITY

According to the present invention, cornering performance of a tire can be improved. In addition, according to the present invention, a lateral force generated upon traveling can be limited, and steering stability can be improved.

What is claimed is:

1. A non-pneumatic tire comprising:
an attachment body attached to an axle;
an outer tubular body configured to radially outwardly surround the attachment body in a tire radial direction;
an inner tubular member fitted onto the attachment body; and
connecting members configured to connect the inner tubular member and the outer tubular body while allowing a displacement therebetween;
the connecting members comprising first elastic connecting plates positioned on a first side in a tire width direction and second elastic connecting plates positioned on a second side in the tire width direction, the first elastic connecting plates and the second elastic connecting plates are disposed at different positions in the tire width direction;
wherein the first elastic connecting plates respectively include central portions in a direction in which the first elastic connecting plates extend between the inner tubular member and the outer tubular body and the second elastic connecting plates respectively include central portions in a direction in which the second elastic connecting plates extend between the inner tubular member and the outer tubular body, the central portions of the first elastic connecting plates are separated from the central portions of the second elastic connecting plates in the tire width direction by a distance of 0.25 to 0.9 times an outer tube width in the tire width direction of the outer tubular body;
first end portions of the first elastic connecting plates are connected to the outer tubular body, and each of the first end portions is radially connected to the outer tubular body;
second end portions of the first elastic connecting plates are connected to the inner tubular body, and each of the second end portions is radially connected to the inner tubular body;
each of the first end portions includes an edge at the first side that extends in a radial direction, and each of the edges is disposed at the same position in the tire width direction as an edge at the first side of the outer tubular body, or disposed inside in the tire width direction of the edge at the first side of the outer tubular body within a distance of 0.1 times the outer tube width or less; and
first end portions of the second elastic connecting plates are connected to the outer tubular body, each of the first end portions includes an edge at the second side that extends in the radial direction, and each of the edges is are disposed at the same position in the tire width direction as an edge at the second side of the outer tubular body, or disposed inside in the tire width direction of the edge at the second side of the outer tubular body and disposed within a distance of 0.1 times the outer tube width or less.

2. The non-pneumatic tire according to claim 1, wherein the first elastic connecting plates and the second elastic connecting plates extend toward opposite directions with respect to the tire circumferential direction and also extend inward from the outer tubular body in the tire radial direction; and
a distance in the tire width direction between the central portions in the tire width direction of the first end portions of all of the elastic connecting plates is 0.7 times the outer tube width or less.

3. The non-pneumatic tire according to claim 1, comprising: a cylindrical tread member fitted onto the outer tubular body;
wherein an outer circumferential surface of the tread member forms a curved surface shape protruding outward in the tire radial direction when seen in a cross-sectional view in the tire width direction.

4. The non-pneumatic tire according to claim 1, wherein a plurality of curved sections curved in the tire circumferential direction are formed on at least one elastic connecting plate of the first elastic connecting plates and the second elastic connecting plates in an extension direction in which the elastic connecting plate extends in a tire side view when the non-pneumatic tire is seen from the tire width direction,
a curvature of one the curved sections is opposite to a curvature of another of the curved sections, the one curved section and the other curved section are adjacent to one another in the extension direction, and
a cross-sectional area of an inflection section of the elastic connecting plate disposed between the curved sections in the extension direction is smaller than a cross-sectional area of any other portion of the elastic connecting plate.

5. The non-pneumatic tire according to claim 4, wherein the cross-sectional area of the elastic connecting plate is reduced toward the inflection section in the extension direction.

6. The non-pneumatic tire according to claim 4, wherein at least one of a size in the tire width direction and a size in the tire circumferential direction of the inflection section of the elastic connecting plate is smaller than any other portions.

7. The non-pneumatic tire according to claim 1, wherein the first elastic connecting plates and the second elastic connecting plates extend outward in the tire width direction from the attachment body toward the outer tubular body.

8. The non-pneumatic tire according to claim 1, wherein all of the elastic connecting plates extend outward in the tire width direction from the outer tubular body toward the attachment body.

9. The non-pneumatic tire according to claim 1, wherein the edge at the first side of each of the first end portions extends in the radial direction along the entire length of the elastic connecting plate from the inner tubular body to the outer tubular body.

* * * * *